United States Patent [19]

Lee et al.

[11] 4,159,311
[45] Jun. 26, 1979

[54] RECOVERY OF LITHIUM FROM BRINES

[75] Inventors: John M. Lee; William C. Bauman, both of Lake Jackson, Tex.

[73] Assignee: The Dow Chemical Company, Midland, Mich.

[21] Appl. No.: 939,546

[22] Filed: Sep. 5, 1978

Related U.S. Application Data

[62] Division of Ser. No. 812,543, Jul. 5, 1977, Pat. No. 4,116,858.

[51] Int. Cl.² ............................................. C01D 15/00
[52] U.S. Cl. .................................. 423/179.5; 423/181
[58] Field of Search ............................. 423/179.5, 181

[56] References Cited

U.S. PATENT DOCUMENTS

| 2,683,124 | 7/1954 | D'Alelio ............................ 252/426 |
| 2,839,569 | 6/1958 | Kramer ............................. 252/426 |
| 2,980,497 | 4/1961 | Goodenough et al. ........... 423/179.5 |
| 3,578,609 | 5/1971 | Haage ............................... 252/430 |
| 3,755,393 | 8/1973 | Kniese et al. ..................... 252/426 |

*Primary Examiner*—O. R. Vertiz
*Assistant Examiner*—Wayne A. Langel
*Attorney, Agent, or Firm*—W. J. Lee

[57] ABSTRACT

Lithium is preferentially extracted from brine containing Li salts along with salts of other metals, e.g. Na, Ca, Mg, K, and/or B, by contacting the brine with a particulate anion exchange resin having suspended therein a microcrystalline form of $LiX \cdot 2Al(OH)_3$, where X = halide.

5 Claims, No Drawings

RECOVERY OF LITHIUM FROM BRINES

CROSS-REFERENCE TO CO-FILED APPLICATION

This is a divisional application of Ser. No. 812,543 filed July 5, 1977 now U.S. Pat. No. 4,116,858.

A related invention is disclosed in our application Ser. No. 812,534, filed July 5, 1977 now U.S. Pat. No. 4,116,856.

BACKGROUND OF THE INVENTION

Various brines exist which contain Li salts. At times, it is desired to preferentially remove and/or recover the Li ion from the brine. In some brines, such as geothermal brines or such as Smackover brines, it is often desirable to remove Li values therefrom, either because one wants the Li values in substantially pure or concentrated form or because one wants the brine to be substantially free of Li.

There are various published articles and patents dealing with Li extraction from brines.

In *Israel J. Chem.* Vol. 1, 1963 (pp. 115-120) there is an article by D. Kaplan titled "Process For The Extraction of Lithium From Dead Sea Solutions." There it is taught that Li is precipitated as lithium aluminate from Dead Sea brines by adding an aluminum salt and an alkali thereto.

There is a U.S. Government Publication, PB 245,686, prepared by Hazen Research, Inc. for the U.S. Department of Interior, Bureau of Mines dated June 12, 1975 and distributed by National Technical Information Service, U.S. Department of Commerce, which is titled "The Recovery and Separation of Mineral Values From Geothermal Brines." The article teaches among other things, the use of aluminum hydroxide as a precipitant for extracting Li from brine. The article also refers to U.S. Pat. Nos. 3,307,922; 3,306,712; 3,537,813; 2,964,381; and 3,306,700.

U.S. Pat. No. 3,307,922 teaches the use of an immiscible monoalkanol or ketone along with ammonia to separate lithium salts from calcium salts in a brine solution.

U.S. Pat. No. 3,306,712 is similar to 3,307,922 above except that it teaches the use of a complexing agent, e.g. urea, to form soluble complexes with the calcium in the brine.

U.S. Pat. No. 3,537,813 involves the use of a metal halide (e.g., iron, cobalt, nickel) to react with lithium in brines, adding acid to avoid hydrolysis of the metal halide, and extraction of the lithium-containing compounds into a water-insoluble organic solvent.

U.S. Pat. No. 2,964,381 teaches to separate lithium values from an aqueous solution which contains alkaline earth metal salts, by adding a soluble aluminum salt to precipitate the lithium as a lithium aluminate complex.

U.S. Pat. No. 3,306,700 enlarges on, and improves, the lithium aluminate complex process of U.S. Pat. No. 2,964,381 above.

Other patents which also help establish the state of the art of extracting lithium values from brines are, e.g., U.S. Pat. Nos. 2,980,497; 2,980,498; 2,980,499; 3,295,920; and 3,268,290.

U.S. Pat. No. 2,980,497 discloses a method of recovering the lithium from a lithium aluminate complex formed, e.g., in the process of U.S. Pat. No. 2,964,381. The method involves heating the complex in water to at least 75° C. to decompose it and then using a strongly acidic cation exchange resin to bind the soluble lithium compound and impurities, subsequently treating the resin with a caustic solution to form soluble lithium hydroxide and insoluble impurities and recovering the lithium hydroxide.

U.S. Pat. No. 2,980,498 shows recovering of lithium values from ores (spodumene, lepidolite, and the like) by using a strongly acidic cation exchange resin in the acid form to obtain an ion exchange of the lithium from the ore. The Li-containing resin is separated from the ore material and the Li is recovered from the resin by e.g., eluting with caustic to get lithium hydroxide. The resin may then be regenerated with an acid to revert back to the acid form.

U.S. Pat. No. 2,980,499 shows improvement over U.S. Pat. No. 2,980,498 above, by contacting the ore with the strongly acidic cation exchange resin at a temperature between 95° C. and 150° C.

U.S. Pat. No. 3,295,920 shows improvement over U.S. Pat. No. 2,980,499 above by contacting the ore and the ion exchange resin in the presence of an aqueous solution containing about 10 to 80% of acetic or propionic acid.

U.S. Pat. No. 3,268,290 shows recovering Li values from sludge which comes from certain electrolytic processes for magnesium production. The lithium recovery involves the use of a short-chain aliphatic monohydric alcohol, heat and agitation to dissolve the Li away from the other components of the sludge, then evaporating the alcohol to obtain LiCl.

It can be seen, then, that there is a recognized need for methods of recovering Li from brines or other aqueous mixtures and solutions which contain metal values other than Li.

The art teaching the formation of lithium aluminate complexes and the use of cation exchange resins to remove Li values from aqueous brines is believed to be the art most pertinent to the present invention.

It is an object of the present invention to provide an ion exchange method of preferentially removing Li values from brines wherein the ion exchange material is long-lived and does not require acid treatment to revert it to the acid form.

Another object is to provide an ion exchange method for preferentially recovering Li values from brines which also contain other metal values.

A further object is to provide an ion exchange resin having incorporated therein $LiX \cdot 2Al(OH)_3$ which, after having LiX partially removed and then contacted with brines containing Li salt and other metal salts, will preferentially form a complex with the Li salt while substantially excluding the other metal salts.

Yet another object is to incorporate $LiX \cdot 2Al(OH)_3$ in an anion exchange resin in such fashion that $Li^+$ may be cyclically removed from brine by the resin and then eluted from the resin, the cycle being performed numerous times before encountering appreciable loss of exchange capacity.

SUMMARY OF THE INVENTION

An anion exchange resin is treated with $AlCl_3$, then with ammonia to change the $AlCl_3$ to $Al(OH)_3$. The resin, containing the $Al(OH)_3$ dispersed in it, is treated with aqueous LiX (where X is halide) and heated for a time sufficient to create a microcrystalline form $LiX \cdot 2Al(OH)_3$ dispersed in the resin. This novel form of resin is useful in preferentially recovering $Li^+$ from brines, including brines which contain $Mg^{++}$. The resin may be cycled numerous times before encountering appreciable loss of exchange capacity. As used herein, the term "microcrystalline" is used to indicate small crystals formed in small pores, voids, and spaces in the resin which are detectable by X-ray diffraction, if not by a microscope.

DETAILED DESCRIPTION OF THE INVENTION

In general, the novel composition disclosed here is an anion exchange resin containing LiX.2Al(OH)$_3$ dispersed or suspended within the resin particles. Throughout this disclosure, LiX refers to lithium halides, especially LiCl. The expression "suspended therein" when referring to compounds dispersed in the resin, means that the compounds are dispersed within the polymer matrices, not merely clinging to the external surfaces of the polymers.

The novel process disclosed here comprises contacting the anion exchange resin, containing Al(OH)$_3$ dispersed within the resin particles, with a Li$^+$-containing (but Mg$^{++}$-free) brine and heating it thereby forming a microcrystalline form of LiX.2Al(OH)$_3$ dispersed in the resin particle, and eluting a portion of the LiX out of the resin with water containing a small amount of LiX. The resin containing the LiX.2Al(OH)$_3$, with a portion of the LiX removed, is usable to remove more Li$^+$ from brines, including brines which contain Mg$^{++}$.

The anion exchange resin with which one starts, may be any particulate water-insoluble polymeric resin which contains basic amine groups attached to the polymeric resin. Macroporous anion exchange resins are preferred over the gel-type resins.

By "macroporous," as the term is commonly used in the resin art, it is generally meant that the pores, voids, or reticules are substantially within the range of about 200 to about 2000 A°. Another term, meaning the same thing is "macroreticular."

Of particular interest are macroporous anion exchange resins sold as DOWEX (a trademark of The Dow Chemical Company) MWA-1 as the chloride form of a particulate polystyrene highly crosslinked with divinylbenzene having —CH$_2$N(CH$_3$)$_2$ groups attached to the benzene rings. These resins have a particle size, generally, of about 20–50 mesh (U.S. Standard Sieve size) and about 30–40% porosity with an internal surface area of about 30–50 m$^2$/gm. Thus, each particle is a reticular solid containing pores of about 200–800 A° in size. The base capacity is about 4.2–4.3 meq./gm. of dry resin in its basic (or free amine) form. The base strength, as measured by a glass electrode in 26% NaCl, is pK$_b$=4×10$^{-7}$ (mid-point in acid-base titration curve is pH=7.6).

Other resins of particular interest are, e.g., those similar to DOWEX MWA-1, with the amine group being —CH$_2$NRR' where R and R' may be, individually, a hydrogen or alkyl group of 1–4 carbon atoms. Also, resins containing other amines or amino groups (tertiary, primary, secondary, cyclic) are within the purview of the present invention.

Other exchange resins which may be employed may be any anion exchange resins with a base strength greater than pK$_b$=1×10$^{-7}$, with macroporous resins being preferred, e.g. Amberlyst A-21.

The Kirk-Othmer Encyclopedia of Chemical Technology, vol. 11, pp. 871-899 on the subject of "Ion Exchange," including discussions of commercially available anion exchange resins, is a helpful reference. Another helpful reference is a book titled "Ion Exchange" by Friedrich Helfferich published by McGraw-Hill, 1962.

Detailed information about pore sizes of "gel-type," "microreticular," and "macroreticular" ion exchange resins may be found in *Ion Exchange in The Process Industries* published in 1970 by The Society of Chemical Industry, 14 Belgrave Square, London, S.W.I, England.

Among the macroporous anion exchange resins, which are within the purview of the present invention are: strongbase resins containing quaternary ammonium groups fixed to a poly(styrene-divinylbenzene); poly (vinyltoluene) which has been side-chain chlorinated and reacted with a tertiary amine to form a quaternary ammonium salt; or any of the water-insoluble, but water-swellable aromatic polymers containing quaternary ammonium groups such as those named in the market place as Dowex MSA-1. Other macroporous strongbase resins are, e.g., AMBERLYST A-26 and 27.

Also gel-type anion exchange resins which contain primary, secondary, tertiary amine and quaternary ammonium groups are operable, such as Amberlite IRA-400, Amberlite IRA-401, Amberlite IRA-402, Amberlite IRA-900, Duolite A-101-D, Duolite ES-111, Dowex 1, Dowex 11, Dowex 21K, Ionac A540, Dowex 44, Duolite A-7, Ionac A-260 and Amberlite IRA-68. Such commercial resins are discussed and described in the literature, such as in the Kirk-Othmer Encyclopedia of Technology and product brochures.

In determining the efficacy of an exchange resin for use in the present invention, particulate macroporous resins which have a porosity of at least about 15%, an internal surface area of at least about 10 m$^2$/gm and a base capacity of at least about 2.0 meq./gm. (dry, basic form) are preferred.

Such resins, if obtained in the base form, are preferably converted to the chloride-form prior to being contacted with the aq. AlCl$_3$. This is conveniently done by treating the amine-form, under reduced pressure, with an excess of aqueous HCl, then filtering, washing and draining off the water. A pressure differential across the filter may be employed to speed the draining process, if desired.

The AlCl$_3$ which is used in treating the chloride-form of the resin is conveniently, and preferably, a saturated aqueous solution containing about 31% to about 32% AlCl$_3$ though weaker concentrations are operable, giving less capacity. Hydrates of AlCl$_3$, such as AlCl$_3$.6-H$_2$O, are useful in preparing the aqueous solutions.

Outlining the overall preferred steps, generally, used in preparing the LiX.2Al(OH)$_3$-containing resin and employing it to recover Li$^+$ values from brine:

1. Impregnate an anion exchange resin with aqueous AlCl$_3$;
2. Treat the AlCl$_3$-impregnated resin with aqueous NH$_3$ to convert the AlCl$_3$ to Al(OH)$_3$;
3. Treat the resulting Al(OH)$_3$-containing resin with aqueous Li halide to provide halolithium aluminate or lithium aluminate dispersed in the resin;
4. Heat the resin, containing the so-formed aluminate, at a temperature and for a time sufficient to form microcrystalline LiX.2Al(OH)$_3$ dispersed in the resin and adjust the pH, if needed, to within the range of about 6.0 to 7.5 in saturated NaCl brine;.
5. Elute a portion of the Li$^+$ values from the resin by employing a weak solution of LiX;
6. Contact the resin, containing the partially LiX-depleted microcrystalline LiX.2Al(OH)$_3$ dispersed therein, with a Li+-containing brine to selectively remove the Li+ from the brine;

7. Repeat steps 5 and 6, sequentially, a plurality of times.

Ordinarily, a cubic foot of resin prepared by the present invention, will contain about 3 to about 12 pounds of microcrystalline LiX.2Al(OH)$_3$, or stated another way, about 50 to about 200 gms./liter of resin.

The above steps are described in greater detail by the following generalized embodiments:

STEP I

The anion exchange resin with which one starts may be impregnated as is with aqueous AlCl$_3$ or may be first converted to its chloride form by being treated with aqueous HCl. The anion exchange resin may be of the "weak base" or "strong base" type, normally containing pendant amine, or quaternary ammonium groups attached to a polymeric structure. If it is desired to convert the basic form of the resin to the chloride form, this may be done, e.g., by contacting the resin with aqueous HCl (of, say, 5–10% concentration). Ambient temperature may be used for the HCl treatment, though slightly increased temperature may also be used. In order to completely "soak" the resin, a reduced pressure is usually helpful during the HCl treatment. An aqueous solution of AlCl$_3$ is impregnated into the resin, whether the resin is in its basic form or its chloride form. The aqueous AlCl$_3$ is preferably concentrated, with a saturated solution of about 31–32% AlCl$_3$ being most preferred. The amount of ag. AlCl$_3$ used should be enough to substantially replace all the liquid which was already in the resin and still have enough to completely flood the resin. The excess aq. AlCl$_3$ is then drained, leaving a resin which is moist; the remaining moisture may be removed, e.g., by blowing hot, dry inert gas or air through the resin, but this is not necessary. Ambient temperature is operable for this step, though increased temperature may be used to speed the process.

An alternative method of impregnating the resin with AlCl$_3$ is to add AlCl$_3$ to a resin/water mixture, but it is generally preferred to flow concentrated aq. AlCl$_3$ through a column bed of resin, thereby replacing the liquid in the resin with the aq. AlCl$_3$.

STEP II

The AlCl$_3$-containing resin is then treated with ammonia, preferably aqueous ammonia, NH$_4$OH, to convert the AlCl$_3$ to Al(OH)$_3$ within the resin particles. Ambient temperature is operable, though increased temperature may be used to speed the process. Generally, it is best to employ an excess of NH$_4$OH to be assured of rapid and complete conversion of the AlCl$_3$ to Al(OH)$_3$. The excess NH$_4$OH may be drained off and it is generally best to flush with enough H$_2$O or NaCl brine to substantially remove the NH$_4$OH, NH$_4$Cl and any Al(OH)$_3$ which may have formed outside the resin particles.

NH$_4$OH is preferred over the use of NaOH or KOH or other strong alkali because the strong alkalis tend to form water-soluble alkali aluminates, such as sodium aluminate, and these soluble aluminates would then be more easily washed from the resin than the Al(OH)$_3$ precipitated by using NH$_4$OH. The quantity of NH$_4$OH to be used is equivalent to the AlCl$_3$ according to the equation $$3NH_4OH + AlCl_3 \rightarrow Al(OH)_3 + 3NH_4Cl$$

plus the amount required to convert the resin to its basic form (assuming that all the resin was converted to the chloride form in Step 1.) The preferred amount is a several-fold excess of concentrated aq. NH$_4$OH over the above minimum amount. The volume of the NH$_4$OH should be as much as is needed to achieve uniform wetting of the resin particles throughout. Preferably at least about 0.5–1.0 part by weight of conc. NH$_4$OH solution (e.g. about 30% NH$_3$) is used per part of AlCl$_3$-containing resin. The Al(OH)$_3$ so-obtained is an "active" Al(OH)$_3$ which will readily absorb LiX from brine solutions; X-ray diffraction pattern analysis indicates this Al(OH)$_3$ has little or no crystallinity.

An alternate, but not preferred, method of converting the AlCl$_3$ to Al(OH)$_3$ is to treat the thoroughly wetted AlCl$_3$- containing resin with NH$_3$ gas or NH$_3$ diluted with air or other inert gas.

STEP III

The active Al(OH)$_3$- containing resin from Step 2 is then treated, at pH 6.0 or higher, with an aqueous solution of lithium halide, especially LiCl. The aqueous solution may be a Li+- containing brine which is Mg++-free. The Li halide combines with the Al(OH)$_3$ to give a halolithium aluminate or lithium aluminate which, by X-ray diffraction, is found to have little or no crystallinity. If the lithium aluminate-resin mixture is employed, without the heat treatment described below, to remove Li+ from brines, it must be reconstructed after one cycle, the residual non-active Al(OH)$_3$ removed, re-impregnated with AlCl$_3$ and then again treated with NH$_3$ to regain the active Al(OH)$_3$ form. It is preferred that the amount of LiX be an amount in excess of that required to complex with the Al(OH)$_3$ to form the structure LiX.2Al(OH)$_3$ in Step IV.

STEP IV

According to the present invention the lithium aluminate-resin, or halolithium aluminate-resin, is heated at an elevated temperature for a time sufficient to convert the aluminate compound to a microcrystalline form having the formula LiX.2Al(OH)$_3$, where X=halide, the crystal structure of which is found to exhibit essentially the same X-ray diffraction pattern as the aluminates prepared according to Goodenough and by Lejus et al.

Formation of a crystalline chlorolithium aluminate is reported by Goodenough and confirmed by X-ray (U.S. Pat. No. 2,964,381). X-ray studies of such compounds are reported by Anne Marie Lejus et al in e.g. *Compt. Rend.* vol. 254 (1962) and in *Rev. Hautes Temper. et Refract.* t. I, 1964, pp. 53–95.

Preferably the elevated temperature is from at least about 50° C. up to the reflux temperature of the mixture, there being enough water present to provide a refluxing portion while maintaining the resin thoroughly wetted during the heating. Ordinarily the time of heating for the temperature range of 50°- reflux will be about one hour to about 16 hours. Insufficient heating or insufficient time of heating may result in having some of the aluminate compound not converted to the microcrystalline form, thereby reducing the cyclable capacity of the resin.

If not enough LiX has been employed in Step III to complex with all the active Al(OH)$_3$ then some crystalline Al(OH)$_3$ may be formed during this Step IV heating step and not form the desired LiX.2Al(OH)$_3$. Such crystalline Al(OH)$_3$, e.g. Bayerite, Gibbsite, Norstrandite, or mixtures of these, are not effective in absorbing LiX from brine in the present invention. Thus, it is preferred that substantially all the active (freshly prepared) Al(OH)$_3$ be complexed with excess LiX and then heated to form microcrystalline LiX.2Al(OH)$_3$ in order to attain or approach the maximum cyclable capacity. A 26% NaCl brine containing at least about 300–1000 mg/l Li$^+$ is suggested for use in this step.

STEP V

A portion of the Li$^+$ values are eluted from the resin using an aqueous wash, preferably containing a small amount of lithium halide, e.g., LiCl. The concentration of lithium halide in the elution liquor is preferably in the range of about 300 to about 1500 ppm. An aqueous elution liquor may be employed which does not contain lithium halide if the elution is done batchwise with only enough water to remove a portion of the LiX from the resin composition, but is not preferred since this may reduce the amount of LiX in a given crystal to less than the amount required to maintain the crystal integrity (crystals may change to Norstrandite and/or Bayerite). It is best, then, to employ at least a small amount of lithium halide in the eluting liquor especially in column operation, to assure that not all, preferably not more than half, the lithium halide in the microcrystalline LiX.2Al(OH)$_3$ is removed. The elution step is best done at elevated temperatures above about 40° C., preferably about 50° C. to reflux temperature.

STEP VI

This step is done, e.g., by contacting the Li$^+$- containing brine with the partially eluted LiX.2Al(OH)$_3$-containing resin from Step V in a column bed by flowing the brine through until the Li$^+$ conc. in the effluent approx. equals the Li$^+$ conc. in the influent. Loading rate is enhanced if the temperature of the brine is above about 40° C., preferably about 50° C. to reflux, most preferably about 80°–108°. Higher temperatures, requiring superatmospheric pressures, require equipment capable of withstanding the pressure.

STEP VII

Steps V and VI are repeated, sequentially, a plurality of times.

The resin, containing the microcrystalline LiX.2Al(OH)$_3$ is re-usable numerous times in a cycling process where Li$^+$-containing brine, even brine containing Mg$^{+++}$, is contacted with the resin to recover Li$^+$ from the brine, then the Li$^+$ values are eluted from the resin using a weak concentration of aq. lithium halide.

EXAMPLE 1

(Preparing the resin/LiCl 2Al(OH)$_3$)

The product is prepared in the following way: 40.0 gms of Dowex MWA-1 (in dry chloride form) is poured into a solution of 12.0 gms. AlCl$_3$ 6H$_2$O in 60 gms. H$_2$O. With hand stirring, using a spatula, uniformly damp particles result. This product is dried at room temperature in a stream of dry air to a weight of 52.67 gms. This free-flowing product is poured into a solution of 55 ml. NH$_4$OH of 8.2% NH$_3$ conc. and mixed as before to uniformly damp particles. Five minutes later it is mixed with 500 ml of 7.0 pH Mg$^{++}$-free Smackover brine containing 15.8% NaCl, 9.1% CaCl$_2$, and 305 mg/liter Li$^+$ and warmed to 56° C. for 45 minutes. The brine is filtered off and found to contain 55 mg/l Li$^+$. Product is mixed with 500 or more ml of fresh brine and warmed to 70° C. over a period of 45 minutes and filtered, with filtrate analyzing 215 mg/liter Li$^+$. An additional 500 ml of brine is mixed with the product and refluxed for 16 hours. The final filtrate contains 280 mg/liter Li$^+$. Thus, the "sucked" dry product contains 182.5 mg Li$^+$. The bulk or settled volume of product is 136 ml. The pore volume is estimated to be 36 ml, which would be filled with final filtrate containing 10.1 mg Li$^+$. Hence, the resin particles contain 172.4 mg Li$^+$ = 0.025 mols Li$^+$. 12.0 gms AlCl$_3$ 6H$_2$O is equivalent to 0.050 mols Al(OH)$_3$. Hence, the final product contains 1 mol Li/2 mol Al. The crystallinity of the compound, denoted here as LiCl.2Al(OH)$_3$ is confirmed by X-ray diffraction analysis.

EXAMPLE 2

(Recover Li$^\pm$ from brine)

The use of the product of Example 1 above is shown here for recovering Li$^+$ from brine:

116 ml of Product from Ex. 1 is put in a water jacketed burette column to produce a resin bed 73 cm in depth. Product is made is saturated with Li$^+$, so it is transferred into the column in 7.0 pH Mg-free Smackover brine (containing 305 mg/liter Li$^+$). Each cycle then consists of elution followed by brine resaturation. 8 cycles are run with downflow of 6.4 ml/min. on water and brine, and all at 85°–90° C. water jacket temperature. When idle (e.g., 5 days between Cycle 5 and 6) the column is left in the brine saturated state and allowed to cool to room temperature. Excessive water washing of earlier products had resulted in inactivation of the LiCl.2Al(OH)$_3$, so a limited quantity of water is used (250 ml on Cycles 1–5, inclusive and 200 ml on 6–8, inclusive) and a small quantity of LiCl is added to the water to limit further the reduction in Li$^+$ content of the resin (0.15% LiCl in Cycles 1 and 2, 0.06% LiCl in Cycles 3–8, inclusive). In each cycle 400 ml of brine follows the water elution. This is about 125 ml more than required for Li$^+$ saturation. The first 5 cycles were Mg$^{++}$-free Smackover brine having 305 mg/liter Li$^+$ at pH 7.0. The remaining cycles were with Smackover brine containing 305 mg/liter Li$^+$ and 0.31% Mg$^{++}$ at pH 6.0. In the 6th cycle the effluent is caught in a series of 18 receivers: 25 ml in cuts 1–12, inclusive, and 50 ml in cuts 13–18, inclusive. These cuts are then analyzed for Li$^+$ content by flame photometry. The analyses for Cycle 6 are:

| Cut No. | mg/l Li$^+$ | Cut No. | mg/l Li$^+$ |
|---|---|---|---|
| 1 | 280 | 10 | 145 |
| 2 | 287 | 11 | 85 |
| 3 | 380 | 12 | 0 |
| 4 | 1220 | 13 | 5 |
| 5 | 700 | 14 | 20 |
| 6 | 345 | 15 | 35 |
| 7 | 245 | 16 | 210 |
| 8 | 195 | 17 | 285 |
| 9 | 165 | 18 | 305 |

Integration of the results shows Li$^+$ removal and recovery of 57.9 mg, which is 39.5% of the Li$^+$ on the resin. Had the brine feed been limited to 275 ml, as required for Li$^+$ saturation, the recovery of Li$^+$ is 69% from the brine. The average Li$^+$ content of the water eluant is 430.7 mg Li/liter = 0.26% LiCl. The peak Li$^+$ observed in the product (1220 mg/l) is 4 times the brine feed concentration. The performance shown in Cycle 6 remained substantially the same through the 8 cycles run: Cycles 1-5, inclusive, using Mg-free brine and Cycles 6, 7 and 8 using untreated brine (with $Mg^{++}$ present).

EXAMPLE 3

A macroporous anion exchange resin (Dowex MWA-1) is converted to the chloride form by treatment with aqueous HCl. The resin is drained, washed with water, and drained again. The drained resin still contains about 59.73% water.

Approximately 135 parts of the drained resin is treated with an excess of 31% aq. $AlCl_3$ and the excess liquid is drained off. In effect, the aq. $AlCl_3$ replaces the water (80.64 parts) in the resin. After draining off the excess aq. $AlCl_3$, the resin is found to weigh about 159.37 parts and by analysis, is found to contain about 39.66 parts $AlCl_3$. Thus, by computation, the resin mixture contained, at this point about 54.36 parts of resin, about 39.66 parts $AlCl_3$ and about 65.35 parts water.

The resin mixture is then treated with about 89.5 parts of 30% $Nh_4OH$ aq. solution; this constituted about 28% excess $NH_3$ over that required, theoretically, to convert the $AlCl_3$ to $Al(OH)_3$ and the resin to the basic form. The resin is washed and drained.

EXAMPLE 4

The above resin, containing the $Al(OH)_3$, is treated with an aqueous solution of LiCl in an amount to flood the resin and to provide more than enough LiCl to complex with most, if not all, of the $Al(OH)_3$ according to the formula $LiCl.2Al(OH)_3$. The mixture is heated at reflux temperature for about 2 hours or more. After this time X-ray diffraction patterns indicate the formation of microcrystalline $LiCl.2Al(OH)_3$ dispersed in the resin structure.

The resin is then used to preferentially separate $Li^+$ from a brine containing about 15.8% NaCl, about 9.1% $CaCl_2$ and about 305 mg/liter $Li^+$. This is done by passing the brine through a column-bed of the resin. After that, the $Li^+$ values are eluted from the resin by using a weak solution of aq. LiCl. The cycles of brine flow and elution are repeated numerous times without encountering a substantial loss of capacity in the exchange resin.

The time cycles for the brine flow and elution are established for a given resin by determining the resin capacity, the concentration of $Li^+$ in the brine, and the elution factors. Once these have been established for a given resin and a given brine, the process may be automatically cycled using conventional methods and techniques known in ion exchange technology.

EXAMPLE 5

To 350 gms. of dry DOWEX MWA-1 (base form) is added 480 gms. $AlCl_3.6H_2O$ dissolved in 410 gms. $H_2O$. The mixture is prepared, with stirring, and then substantially dried by air-blowing at ambient temperature. The "dried" mixture is found to stil contain about 25.9% $H_2O$.

To the mixture is added, with stirring, a solution prepared by diluting 430 ml. of 30% $NH_3$ aqueous solution with 100 ml $H_2O$. The resulting exotherm brings the mixture to about 67° C. After standing for about 1.5 hours during which time the temperature drops to about 48° C., the mixture is washed with 3 portions of 1000 ml. each of a saturated NaCl solution to elute excess $NH_4OH$ and also $NH_4Cl$ and $Al(OH)_3$ formed outside the resin particles. After each washing step, the NaCl brine is decanted. By analysis, it is found that 3.9% of $Al^{3+}$ is removed by the washings.

The resin, still moist with NaCl brine, is added to enough NaCl brine to bring the total volume to 3 liters. Then there is added 85 Gms. of dry LiCl, which dissolves, and a small amount of $NH_3$ is added to assure that the mixture is not too far on the acid side. The pH, as measured by a glass electrode with a KCl bridge, is found to be 8.3. This addition of $NH_3$ is optional and is not needed if the pH is known to be above about 6.5.

The mixture is then heated in a large beaker for 15 minutes during which time the temperature increases to about 63° C. and the pH drops to about 7.06. A small amount of $NH_3$ is added, bringing the pH to 7.5 but $NH_3$ comes out and the pH quickly drops to about 7.0–7.1.

The mixture is transferred to a round-bottom flask equipped with a reflux condenser and heated at reflux for about 2.5 hours. The resin mixture is filtered out on a glass frit using a Buchner funnel. The still-moist solids are rinsed twice with 600 ml. distilled water. Analysis indicates there is about 41.7 gms. LiCl in the filtrate, and about 8.73 gms. in the wash water, thus there is a net deposit in the resin particles of about 34.56 gms. LiCl.

In an effort to assure high loading, the resin, after drying to a water content of about 11.2% and a weight of about 569.3 gms., is treated with a solution prepared by dissolving 280 gms. $AlCl_3.6H_2O$ in 240 gms. $H_2O$, stirred well, then air-dried overnight down to about 804 gms. To this is added 250 ml. of 30% $NH_3$ with 50 ml. $H_2O$ added to it, and stirred; it exotherms to about 83° C. Then mix with 1800 ml. NaCl brine and decant. Analysis shows that 8.04 gms. of the $AlCl_3.6H_2O$ does not stay with the resin. 41.7 gms of LiCl in the above filtrate is enriched by adding 8 gms of LiCl to it and is then mixed with the drained resin. At this point the total volume is about 3700 ml. with pH 7.78. The mixture is heated in a beaker to 54° C. with intermittent stirring and the pH drops to 7.34.

The mixture is transferred back to the reflux pot and heated up to reflux within an hour and refluxed for about 80 minutes and allowed to stand and cool overnight, then filtered. Analysis for Al and Li in the filtrate and calculations based thereon determines that the resin contains 1.37 moles $Li^+$ and 3.05 moles $Al^{3+}$. This is 0.449 $Li^+$ per $Al^{3+}$ which is 89.8% of theoretical amount of Li:Al in the formula $LiCl.2Al(OH)_3$. X-ray diffraction pattern indicates presence of crystalline $LiCl.2Al(OH)_3$.

The resin is transferred to a jacketed, heated exchange column, and flooded with NaCl brine (actually it is the filtrate from above and containing a small amount of $Li^+$). Then alternate cycles of wash water (containing about 50 ppm $Li^+$) and Smackover brine (pH 5.6) at a pump rate of 13 ml/min. for about 70 minutes while heating at about 90° C. The wash cycles are at 13 mls/min. for 27 minutes and are at ambient temperature but become heated by the column heated at 90° C. The results of the fourth full wash cycle, taken in 25 ml cuts, is shown below:

| Cut No. | $Li^+$ mg/liter* | Remarks** | Cut No. | $Li^+$ mg/liter* | Remarks** |
|---|---|---|---|---|---|
| 1 | 400 | Start wash | 10 | 500 | |
| 2 | 430 | brine | 11 | 420 | |

-continued

| Cut No. | Li+ mg/liter* | Remarks** | Cut No. | Li+ mg/liter* | Remarks** |
|---|---|---|---|---|---|
|   |   | coming out |   |   |   |
| 3 | 460 |   | 12 | 370 |   |
| 4 | 1560 |   | 13 | 333 |   |
| 5 | 1540 |   | 14 | 310 |   |
| 6 | 1130 |   | 15 | 280 | start brine |
| 7 | 880 |   | 16 | 250 |   |
| 8 | 700 |   | 17 | 65 | wash coming out |
| 9 | 580 |   | 18 | 80 |   |

*not adjusted for Sr++ values which interfere with Li+ analysis, but stay in the brine.
**About 75 ml. hold-up in the column.

EXAMPLE 6

Large particles of spodumene ore, roasted at 900°–1000° C., are ground up and screened to 35–100 mesh (U.S. Standard Sieve Size). 41.7 gms. (44.5 cc) of the screened ore is placed in the bottom of a column with a cross-sectional area of 1.59 cm² to a depth of 28 cm. On top of that is placed 71.5 ml. of a resin/LiCl·2Al(OH)$_3$ exchange agent prepared in accordance with the present disclosure. The bed depth of the resin/LiCl·2Al(OH)$_3$ is about 45 cm.

Brine (26% NaCl and containing 140 mg/liter Li+) is circulated downwardly at a pump rate of about 3.2 ml/min. of flow. The column holds about 60 ml. of the brine and a hold-up (inventory) pot holds about 40 ml., with the re-cycle lines and pump lines holding about 25 ml. After circulating for 15 min. with column heated at about 95° C., the brine in the inventory pot is found, by analysis, to contain about 500 mg/liter Li+. The system is allowed to cool overnight.

The column is re-heated to 95° C. and circulation of the inventory brine is resumed. After 15 min. analysis shows 395 mg/liter Li+; after 30 min., 430 mg/liter Li+, after 75 min., 630 mg/liter Li+; after 105 min., 710 mg/liter Li+; and after 125 min., 730 mg/liter Li+.

After 130 min., 25 ml. of Smackover brine is added, bringing the total brine in the circulating system to about 150 ml. After 185 min. analysis shows 775 mg/liter Li+; after 220 min., analysis shows 785 mg/liter Li+.

At this point 75 ml. of the circulating brine is removed and replaced with 75 ml. of Smackover brine and circulation is resumed. After 10 min., analysis shows 905 mg/liter Li+ and after 30 min, 890 mg/liter Li+ (Li+ analysis is affected by Sr+ in the brine). The system is apparently at, or near equilibrium at this point, so all the inventory is removed, except that held in the column and a wash cycle of water (containing about 180 mg/liter Li+) is flushed downwardly through the column at 95° C. and a pump rate of 3.2 ml/min. At start of the wash cycle 15 ml. samples are taken of the effluent. After 135 ml. of wash water is added, switch to 26% NaCl brine wash for 90 ml. 15 samples of 15 ml. each analyze for Li+ (mg/liter) as follows:

| Sample | Li+ | Sample | Li+ | Sample | Li+ |
|---|---|---|---|---|---|
| 1 | 610 | 6 | 1750 | 11 | 430 |
| 2 | 575 | 7 | 1700 | 12 | 375 |
| 3 | 580 | 8 | 1000 | 13 | 365 |
| 4 | 670 | 9 | 670 | 14 | 480 |
| 5 | 840 | 10 | 520 | 15 | 340 |

Recycling the 26% effluent back as influent, after 45 min. the effluent is 160 mg/liter Li+; after 60 min., 160 mg/liter Li+. Shut down for 2 days and start up again; effluent still coming out 160 mg/liter Li+. After 5 hours more of recirculation, effluent is 280 mg/liter Li+. Run terminated.

Synthetic or natural brines containing Li+ values are within the purview of the present invention and include such natural brines as Smackover brines (such as found at Magnolia, Ark.), Ludington brine (such as found at Ludington, Mich.), Monroe brine (such as found near Midland, Mich.), and other Li-rich brines such as found at Silver Peak, Nev., Great Salt Lake, Searles Lake (California), Dead Sea, and many others. Li+- containing brines also exist in many other parts of the world, e.g., in South America.

The foregoing examples are to illustrate embodiments of the invention, but the invention is limited only by the following claims.

We claim:

1. A process for removing Li+ from aqueous brines, said process comprising, in sequence, the steps of:
   a. contacting a Li+-containing brine with an anion exchange resin having suspended therein a microcrystalline form of LiX·2Al(OH)$_3$, where X is halogen;
   b. eluting Li+ values from the resin by contacting it with an aqueous wash liquor; and
   c. repeating steps (a) and (b), sequentially, a plurality of times by using the resin from step (b) as the resin in step (a).

2. The process of claim 1 wherein the anion exchange resin is macroporous.

3. The process of claim 4 wherein the amount of lithium halide dissolved in the wash liquor is about 50 to about 200 mg. per liter, as Li+.

4. The process of claim 1 wherein the aqueous wash liquor contains a small amount of lithium halide dissolved therein.

5. A process for recovering Li+ values from Li+ containing ores, said process comprising:
   providing the ore in particulate form and leaching water-solubles from the ore using an aqueous brine wash, thereby forming an aqueous brine solution containing Li+ values,
   contacting the so-formed Li+-containing aqueous brine solution with an anion exchange resin having suspended therein a microcrystalline form of LiX·2Al(OH)$_3$, where X is halogen,
   eluting Li+ values from said exchange resin, by using an aqueous wash, and
   recovering Li+ values from said aqueous wash.

* * * * *

UNITED STATES PATENT AND TRADEMARK OFFICE
CERTIFICATE OF CORRECTION

PATENT NO. : 4,159,311
DATED : June 26, 1979
INVENTOR(S) : John M. Lee and William C. Bauman It is certified that error appears in the above-identified patent and that said Letters Patent are hereby corrected as shown below:

Column 2, line 66; change "MG" to --Mg--.

Column 5, line 31; change "ag" to --aq--.

Column 8, line 1; "or" should be deleted.

Column 8, line 24; change first "is" to --as--.

Column 9, line 23; change "$Nh_4OH$" to --$NH_4OH$--.

Column 9, line 60; change "stil" to --still--.

*Signed and Sealed this*

*Twenty-seventh* Day of *November 1979*

[SEAL]

Attest:

RUTH C. MASON
*Attesting Officer*

LUTRELLE F. PARKER
*Acting Commissioner of Patents and Trademarks*